United States Patent [19]

Mock

[11] 4,322,234
[45] Mar. 30, 1982

[54] MIST ELIMINATOR AND WET DECK PACK
[75] Inventor: Donald E. Mock, Azusa, Calif.
[73] Assignee: Cetec Corporation, El Monte, Calif.
[21] Appl. No.: 242,035
[22] Filed: Mar. 9, 1981
[51] Int. Cl.³ ............................................. B01D 45/16
[52] U.S. Cl. .................................................... 55/440
[58] Field of Search .................. 55/278, 440, 257 PV, 55/436

[56] References Cited

U.S. PATENT DOCUMENTS

| | | | |
|---|---|---|---|
| 1,564,075 | 12/1925 | Lakin | 55/440 X |
| 3,479,018 | 11/1969 | Jaye | 55/278 X |
| 4,054,529 | 10/1977 | Pielkenrood | 55/440 X |
| 4,150,960 | 4/1979 | Pooser, Jr. | 55/440 |

FOREIGN PATENT DOCUMENTS 1036799  8/1978  Canada .......................... 55/257 PV Primary Examiner—Kathleen J. Prunner

[57] ABSTRACT

A mist eliminator pack formed of a plurality of corrugated sheets with elongate retainer bars between sheets, with the bars having projecting barbs engaging sheet openings and with the bars having end grooves receiving sheet edges, and including elongate spacer strips with grooves receiving the ends of the retainer bars to form a substantially rigid assembly with sinuous flow paths between sheets.

6 Claims, 5 Drawing Figures

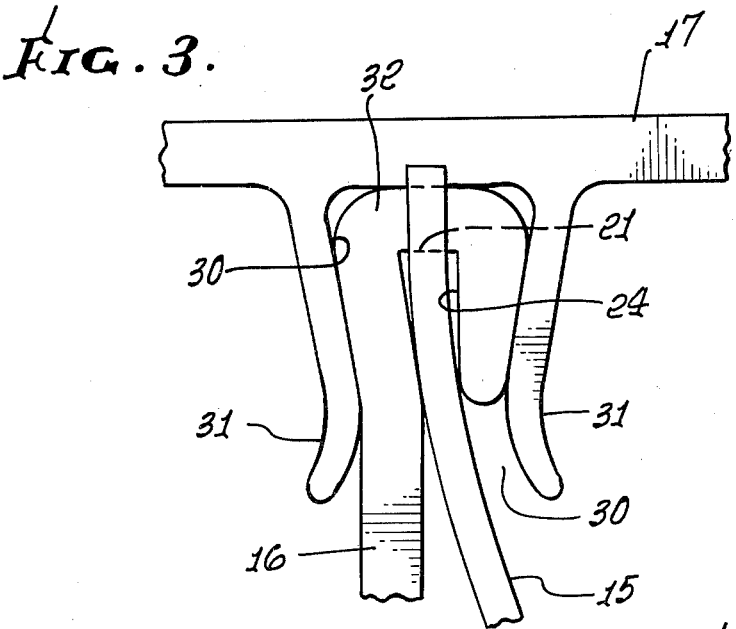
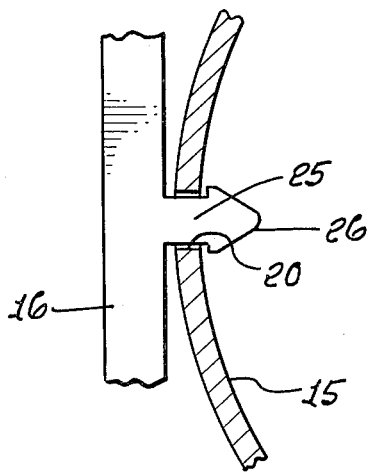
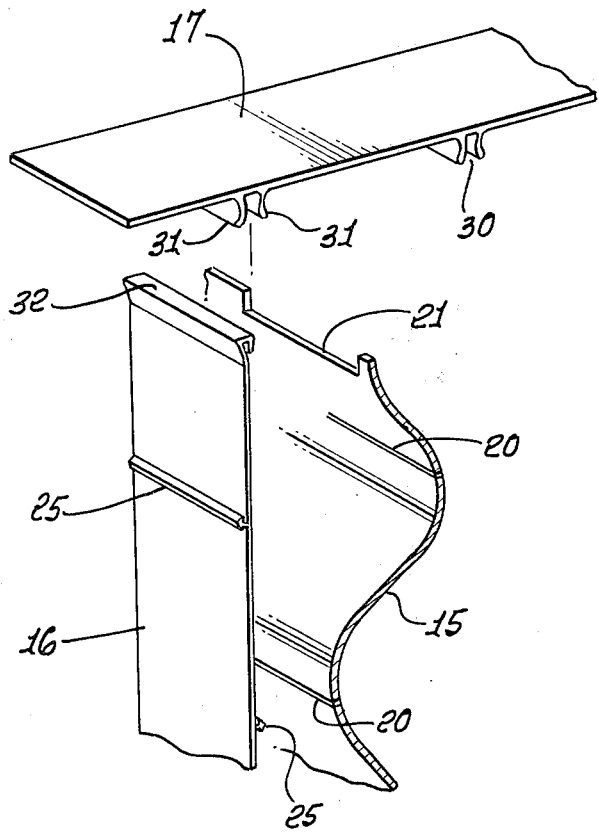

4,322,234

MIST ELIMINATOR AND WET DECK PACK

BACKGROUND OF THE INVENTION

This invention relates to mist eliminators or wet decks or condensors, these being different designations for the same general item. A mist eliminator is utilized for removing mist or vapor from a gas stream by condensing the vapor into a liquid. Conventional mist eliminators are provided with a plurality of spaced plates which provide some form of non-straight or diverted flow paths for the gas stream. Typically, the gas stream flows upward through the mist eliminator, with the vapor impinging on the plates and condensing as liquid, which runs downward, separating it from the upwardly flowing gas or stream. In the prior devices, the condensor plates or sheets are assembled with spacers there between and are held in position with long bolts which have to be inserted through the sheets and spacers. This is a difficult and time-consuming assembly operation.

It is an object of the present invention to provide a new and improved mist eliminator pack which does not require bolts for assembly. A further object of the invention is to provide such a mist eliminator pack wherein the components can be assembled by pressing together without requiring any type of bolt or other separate fastener. An additional object of the invention is to provide such a mist eliminator pack wherein the components can be made of plastic and wherein an adhesive can be used at the junctions of the components to provide improved rigidity of the assembly.

Other objects, advantages, features and results will more fully appear in the course of the following description.

SUMMARY OF THE INVENTION

The mist eliminator pack of the invention includes a plurality of condensor sheets, each having rows of spaced openings, a plurality of elongate retainer bars, each having a groove at each end for receiving the edge of a condensor sheet and having spaced projections on each side, and a plurality of elongate spacer strips, each having spaced grooves for receiving the ends of the retainer bars. The sheets and bars are assembled in sandwich relation with projections of the bars inserted in corresponding openings of the sheets providing the desired flow paths between the sheets. The bars are joined at their ends by insertion into corresponding grooves of the strips, providing the assembled mist eliminator pack.

BRIEF DESCRIPTION OF THE DRAWINGS

FIG. 3 is an enlarged view showing the portion 3 of FIG. 2;

FIG. 4 is an enlarged view showing the portion 4 of FIG. 2; and

FIG. 5 is an exploded view illustrating the assembly of the three components of the pack.

DESCRIPTION OF THE PREFERRED EMBODIMENT

Figure 1:
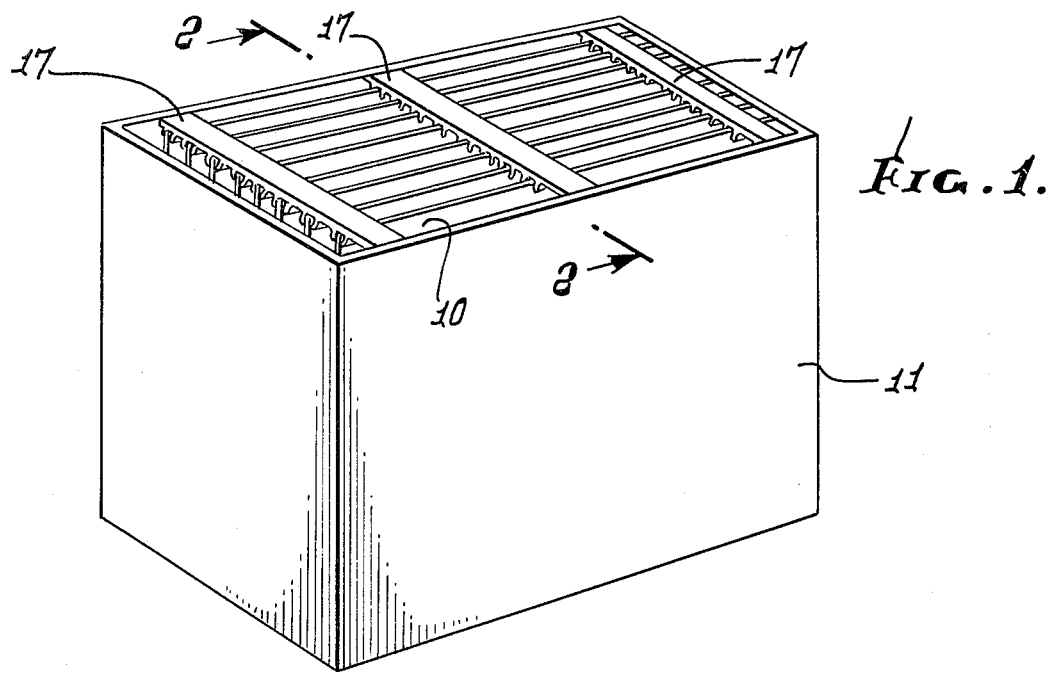
FIG. 1 is a perspective view of a mist eliminator pack incorporating the presently preferred embodiment of the invention.
Figure 2:
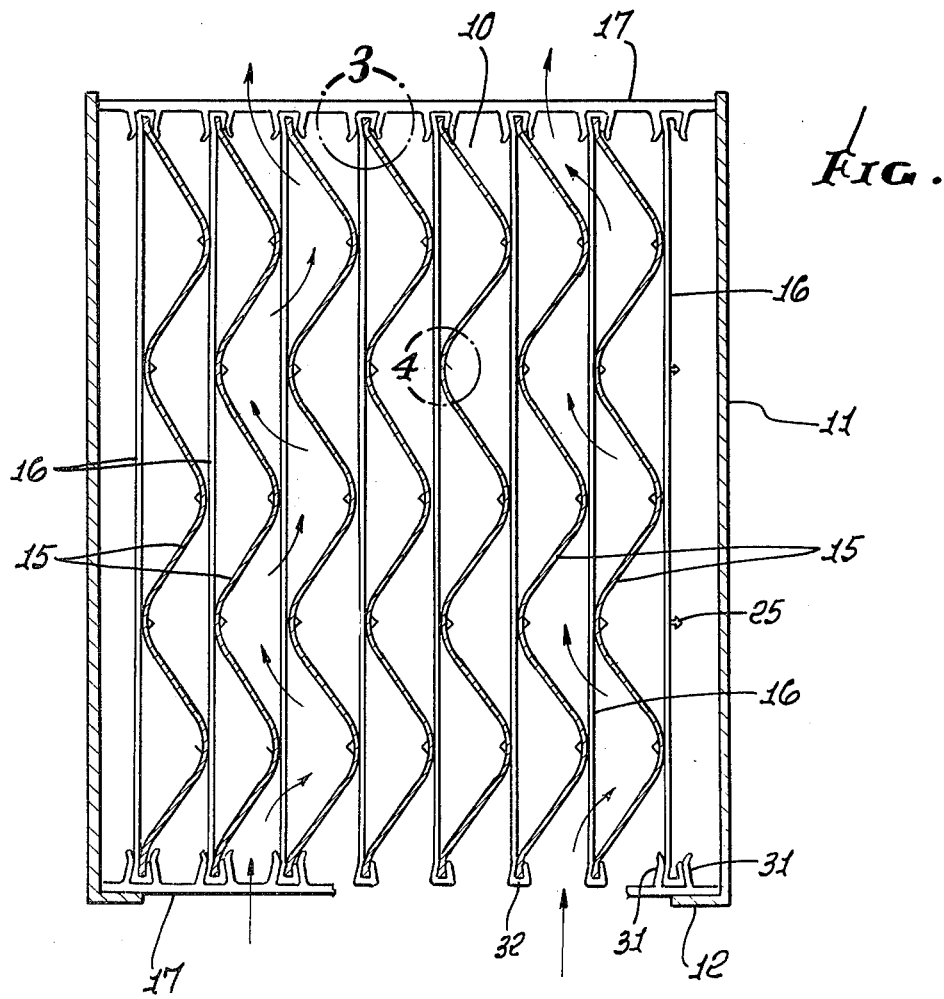
FIG. 2 is a sectional view taken along line 2—2 of FIG. 1.

In the embodiment shown in FIGS. 1 and 2, a mist eliminator pack 10 is positioned within a housing 11, which housing is open at the bottom and the top, permitting fluid flow through the pack 10. The pack rests on bottom flange 12 of the housing 11. The housing is not essential, but does provide a suitable means for supporting the pack. One pack can be stacked on another if desired.

The pack 10 is formed of corrugated sheets 15, elongate retainer bars 16, and elongate spacer strips 17. While corrugated sheets are shown in the drawings, other sheet configurations may be utilized, including those used in the prior art mist eliminators. The sheets may be zig-zag or Z-shaped, and may have protruding fingers and/or holes. The significant characteristic is that the sheets provide some form of flow diversion so that the upward flowing gas stream will impinge on the sheets so that liquid droplets can form on the sheet surface.

The sheets 15 have rows of spaced openings 20, which typically are parallel slits or slots formed at the peaks and troughs of the corrugation. In the preferred embodiment, notches 21 are provided at the upper and lower edges of the sheets for positioning the sheets in the retainer bars 16, as will be described below.

Each of the retainer bars 16 has a groove 24 at each end, and projections in the form of ribs 25, preferably with enlargements 26 at the outer ends, which enlargements may be barbs as shown in the drawings, or balls or otherwise as desired. The projections 25 are spaced along each side of the retainer bar 16 at locations to correspond with the openings 20 in the sheets 15.

Each of the spacer strips 17 has a plurality of grooves 30 which typically are formed by projecting ribs 31. Preferably, the grooves 30 are wider at the base than adjacent the outer ends, and the ends 32 of the retainer bars 16 are similarly shaped.

The mist eliminator pack is assembled by starting with a group of the bars 16 (three in the embodiment shown in FIG. 1) and a sheet 15, and inserting opposite edges of the sheet in the grooves in the ends of the bars, with the notches 21 of the sheets providing for positioning the sheet relative to the bars. The projections 25 of the bars are pressed through the openings 20 of the sheets. While the openings are shown as straight lines, they could be I-shaped for greater flexibility in assembly.

Next another group of bars is pressed into the openings from the other side of the sheet, and this process is repeated with another sheet and then a third group of bars until the assembly is completed. In the pack shown in FIGS. 1 and 2, eight groups of bars and seven sheets are utilized.

Next spacer strips are positioned at the top and at the bottom, as seen in FIGS. 2 and 3, with the ends of the retainer bars being pressed into the spacer strip grooves. This completes the assembly of a mist eliminator pack unit. While one such unit is shown in FIGS. 1 and 2, a plurality of such units could be assembled side by side if desired. The assembled pack provides the vertically directed sinuous paths between the spaced condensor sheets, as shown by the arrows in FIG. 2.

The components of the pack typically are made of plastic. A few drops of adhesive or solvent on the component at the locations where they come together may be utilized to provide a solid bond and a substantially rigid assembly.

I claim:

1. In a mist eliminator pack, the combination of:

a plurality of nonplanar condenser sheets, each of said sheets having rows of spaced openings;

a plurality of elongate retainer bars with each bar being disposed adjacent a respective row of said openings, each of said bars having a groove at each end for receiving the edge of a condenser sheet and having spaced projections on each side which are aligned with said openings; and a plurality of elongate spacer strips, each of said strips having spaced grooves for receiving said ends of said retainer bars;

with said sheets and bars assembled in sandwich relation with opposite edges of each sheet being disposed in said grooves of corresponding bars and with projections of said bars inserted in corresponding openings of said sheets providing flow paths between sheets, and with said bars joined at their ends to said strips by insertion in corresponding grooves of said strips providing the mist eliminator pack.

2. A mist eliminator pack as defined in claim 1 wherein said retainer bar projections have enlarged outer ends.

3. A mist eliminator pack as defined in claim 1 wherein said openings in each row are parallel and said projection of said bars comprise spaced parallel ribs, with the ribs on one side offset along the axis of the bar from the ribs on the opposite side.

4. A mist eliminator pack as defined in claim 3 wherein said sheets have notches along said opposite edges where said edges are disposed in said grooves of said bars for receiving said ends of said bars.

5. A mist eliminator pack as defined in claim 1 wherein each spacer strip groove is formed by spaced projecting ribs, with the distance between said ribs at the strip being greater than the distance between said ribs adjacent the outer ends thereof, and with said ends of said bars having a corresponding shape for gripping by said groove-forming ribs.

6. A mist eliminator pack as defined in claim 1 including adhesive at the junctions of said bar projections and sheet openings, and at the junctions of said sheets, bars and strips.

* * * * *